Sept. 6, 1938.　　G. E. FALLESEN ET AL　　2,129,207
PRINT-OUT EMULSION
Filed Feb. 9, 1937
Print-out Emulsion formed of Silver Hydroxide-Organic Alkali Complex and a Halide, containing m-phenylenediamine or m-aminophenol or their salts
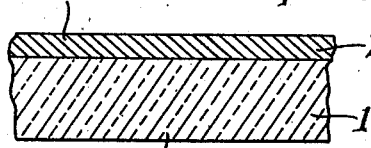
Glass or cellulose ester support
George E. Fallesen
Cyril J. Staud
INVENTORS
BY
ATTORNEYS Patented Sept. 6, 1938

2,129,207

UNITED STATES PATENT OFFICE 2,129,207

PRINT-OUT EMULSION

George Earle Fallesen and Cyril J. Staud, Rochester, N. Y., assignors to Eastman Kodak Company, Rochester, N. Y., a corporation of New Jersey Application February 9, 1937, Serial No. 124,864

8 Claims. (Cl. 95—7)

This invention relates to photographic material and more particularly to a print-out photographic emulsion having increased sensitivity to light.

Of the two types of commonly used photographic emulsions, known respectively as developing emulsions and print-out emulsions, the present invention relates primarily to the latter type. In these emulsions, a visible image is produced directly by the action of light, as compared with developing emulsions in which the image is rendered visible, after exposure, by treatment with a developing solution.

In our prior patent, No. 2,030,860, granted February 18, 1936, we disclosed a method for making a highly sensitive print-out emulsion. According to the invention disclosed therein, the print-out emulsion was produced by precipitating silver hydroxide with ammonia from a silver nitrate solution, dissolving the precipitate in an organic base, mixing this solution with a carrier such as gelatin and adding to it a halide such as potassium bromide. To the emulsion thus formed, there could be added a further quantity of silver nitrate or an additional amount of sodium nitrite, which results in an increased sensitivity.

It was found that when the emulsions made according to our prior patent were coated on glass or cellulose ester supports, the sodium nitrite exhibited a tendency to crystallize out. A further disadvantage of the sodium nitrite was that it tended to weaken the gelatin in the emulsion, thereby increasing the difficulties of coating on glass or cellulose ester supports. Although a coating of the emulsion with excess silver nitrate could be made on glass without crystallization ensuing, there was found to be an appreciable loss of print-out sensitivity without the sodium nitrite.

It is, therefore, an object of the present invention to provide a highly sensitive print-out emulsion which may be coated on a cellulose ester or glass support without objectionable crystallization of the emulsion constituents. A further object is to provide a print-out emulsion which may be easily coated on glass or cellulose ester supports.

These objects are accomplished by substituting metaphenylenediamine or meta-aminophenol or one of their salts such as a hydrochloride, for sodium nitrite and excess silver nitrate in the emulsion of our prior Patent No. 2,030,860.

In the accompanying drawing the single figure is a sectional view of a film or plate made according to our invention.

The following examples illustrate methods of forming a highly sensitive print-out emulsion suitable for coating on glass or cellulose ester supports.

Example I 3 solutions are formed as follows:

Solution A is made by dissolving 25 grams of silver nitrate in 75 cc. of water and adding to this solution 5 cc. of ammonium hydroxide solution (28% concentration). A precipitate of silver hydroxide is formed which is then dissolved in 35 cc. of pyridine.

Solution B is made by dissolving 10 grams of potassium bromide, 10 grams of sodium chloride, and 0.025 grams of potassium iodide in 63 cc. of water.

Solution C consists of 40 grams of gelatin in 700 cc. of water.

An emulsion is made from these solutions by adding one half of solution C to solution A and the other half of solution C to solution B. The mixtures AC and BC are then poured together alternately at 40° C. The temperature of this mixture is gradually brought up to 75° C. in 15 minutes and the mixture is then chilled to 35° C. as rapidly as possible. The emulsion is set and shreaded and washed for one hour, after which 20 grams of gelatin are added and dissolved at a temperature of 40° C. to 60° C. in 10 minutes. A solution of 10 grams of meta-phenylenediamine in 16 cc. of glycerin was then added and the emulsion chilled to coating temperature as rapidly as possible.

Example II

Two solutions were made up as follows:

Solution A was formed by dissolving 400 grams of silver nitrate in 1200 cc. of water and adding 80 cc. of ammonium hydroxide (28% concentration) to the solution. A precipitate of silver hydroxide was formed and this was dissolved in 560 cc. of pyridine. The temperature during this operation was kept at 52° C.

Solution B was formed by dissolving 320 grams of potassium bromide and 450 grams of gelatin in 5600 cc. of water.

An emulsion was made from these solutions by adding solution A to solution B at 52° C. This mixture was digested for one hour at 52° C. and was then set, shredded, and washed for one hour. There was then added a solution of 64 cc. of glycerin containing 46.5 grams of meta-phenylenediamine dihydrochloride.

The compounds which we contemplate using in the emulsion to intensify the printing-out density are meta-phenylenediamine (the free base) or its salts such as meta-phenylenediamine-dihydrochloride and meta-aminophenol or its salts such as meta-amino-phenolhydrochloride. We may also use other salts, such as the sulfates.

In these emulsions, the addition of excess silver nitrate in combination with the aforementioned salts appears to be detrimental, causing a brown fog and large specks of silver.

In addition to pyridine, other organic bases or alkalies may be used to dissolve the silver hydroxide precipitate. These include the amines, such as methylamine, benzylamine, naphthylamine, and triethanolamine; heterocyclic nitrogen bases such as pyridine, piperidine, quinoline, (in methyl alcohol), acridine (in methyl alcohol), and α-picoline; amides such as acetamide. As halides, we have found that both potassium bromide and potassium chloride or mixtures of these two, either with or without potassium iodide are satisfactory.

As disclosed in our prior patent, the gelatin used to disperse the sensitive salt, may be replaced by cellulose mixed esters such as cellulose acetate phthalate. In this case, the halide used to form the sensitive salt may be replaced by bromacetic acid or other halogenated aliphatic acids or with other bromide or halide substituted compounds, such as bromo-esters, in the manner disclosed in our prior patent.

In the single figure of the accompanying drawing, we have shown in sectional view a photographic element formed according to our invention. As shown therein, 1 is the support of glass or a cellulose ester and 2 is the sensitive emulsion formed according to our process.

The emulsions produced by the method described above have about the same sensitivity as the emulsions obtained by the process of our prior Patent No. 2,030,860. They may be coated on glass or cellulose ester supports without objectionable crystallization of the emulsion constituents. On exposure to light, the emulsions print out with neutral gray tones at a high rate of speed. If desired, the emulsion may also be developed after exposure.

It is to be understood that the examples included in the above specification are illustrative only and that our invention comprises all modifications and equivalents coming within the scope of the appended claims.

We claim:

1. A process of producing a light-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding from about 10% to about 17%, based on the weight of inert carrier, of a compound selected from the group consisting of meta-phenylenediamine compounds and meta-aminophenol compounds.

2. A process of producing a light-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding from about 10% to about 17%, based on the weight of inert carrier, of a meta-phenylenediamine.

3. A process of producing a light-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding from about 10% to about 17%, based on the weight of inert carrier, of meta-phenylenediaminehydrochloride.

4. A process of producing a light-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding from about 10% to about 17%, based on the weight of inert carrier, of a meta-aminophenol.

5. A process of producing a slight-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding from about 10% to about 17%, based on the weight of inert carrier, of meta-aminophenolhydrochloride.

6. A light-sensitive surface comprising the product resulting from the reaction of a complex solution of silver hydroxide in an organ alkali on an alkali metal halide in the presence of gelatin and containing from about 10% to about 17%, based on the weight of gelatin, of a compound selected from the group consisting of meta-phenylenediamine compounds and meta-aminophenol compounds.

7. A photographic element comprising a cellulose ester support coated with gelatin containing the product resulting from the reaction of a complex solution of silver hydroxide in an organic alkali, on an alkali metal halide, and containing from about 10% to about 17%, based on the weight of gelatin, of a meta-phenylenediamine.

8. A photographic element comprising a cellulose ester support coated with gelatin containing the product resulting from the reaction of a complex solution of silver hydroxide in an organic alkali, on an alkali metal halide, and containing from about 10% to about 17%, based on the weight of gelatin, of a meta-aminophenol.

GEORGE EARLE FALLESEN.
CYRIL J. STAUD.

CERTIFICATE OF CORRECTION.

Patent No. 2,129,207. September 6, 1938.

GEORGE EARLE FALLESEN, ET AL.

It is hereby certified that error appears in the printed specification of the above numbered patent requiring correction as follows: Page 2, second column, line 30, claim 5, for "slight-sensitive" read light-sensitive; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.